United States Patent
Wu et al.

(10) Patent No.: US 11,724,949 B2
(45) Date of Patent: Aug. 15, 2023

(54) BAFFLED INTEGRATED DENITRIFYING AND DECARBONIZING DEVICE WITH ANAEROBIC BIO-NESTS AND BAFFLED INTEGRATED DENITRIFYING AND DECARBONIZING PROCESS WITH ANAEROBIC BIO-NESTS

(71) Applicant: JIANGSU UNIVERSITY, Zhenjiang (CN)

(72) Inventors: Zhiren Wu, Zhenjiang (CN); Xiangtong Zhou, Zhenjiang (CN); Haipeng Xi, Zhenjiang (CN); Chengye Liu, Zhenjiang (CN); Zhigang Liu, Zhenjiang (CN); Suying Jiang, Zhenjiang (CN); Hongjun Dong, Zhenjiang (CN); Zhishui Liang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/988,883

(22) Filed: Nov. 17, 2022

(65) Prior Publication Data
US 2023/0078272 A1 Mar. 16, 2023

Related U.S. Application Data

(63) Continuation of application No. PCT/CN2021/130841, filed on Nov. 16, 2021.

(30) Foreign Application Priority Data

Nov. 20, 2020 (CN) .......................... 202011312077.4

(51) Int. Cl.
*C02F 3/28* (2023.01)
*C02F 3/30* (2023.01)
*C02F 101/16* (2006.01)

(52) U.S. Cl.
CPC ............ *C02F 3/284* (2013.01); *C02F 3/2806* (2013.01); *C02F 3/303* (2013.01); *C02F 3/305* (2013.01);
(Continued)

(58) Field of Classification Search
CPC ........ C02F 3/284; C02F 3/2806; C02F 3/303; C02F 3/305; C02F 2101/16; C02F 2301/046
(Continued)

(56) References Cited

U.S. PATENT DOCUMENTS 7,226,539 B2* 6/2007 Dong .................. C02F 3/286
210/603
2004/0251198 A1* 12/2004 Lord .................. C02F 3/1215
210/615
(Continued)

FOREIGN PATENT DOCUMENTS

CN 201296706 Y 8/2009
CN 104609558 A 5/2015
(Continued)

*Primary Examiner* — Fred Prince
(74) *Attorney, Agent, or Firm* — Stuart H. Mayer; Mayer & Williams PC (57) ABSTRACT

Disclosed are a baffled integrated denitrifying and decarbonizing device with anaerobic bio-nests and a baffled integrated denitrifying and decarbonizing process with anaerobic bio-nests thereof. The wastewater with low carbon-nitrogen ratio first enters anaerobic chamber I, then enters anaerobic chamber II and chamber III to complete anaerobic decarbonization and denitrification. The chambers are provided with modified basalt fiber carrier media to enrich a large number of functional microorganisms, and improve the device in terms of anaerobic treatment efficiency. Fermentation liquid in chamber III then flows back to aerobic chamber IV to complete the nitrification process. Nitrified liquid enters chamber I and mixes with influent for (Continued)

further treatment, and effluent is finally discharged from chamber III. The clapboard and basalt fiber felt in chamber IV can retain and enrich autotrophic/heterotrophic nitrifying bacteria.

6 Claims, 4 Drawing Sheets

(52) U.S. Cl.
CPC .... *C02F 2101/16* (2013.01); *C02F 2301/046* (2013.01)

(58) Field of Classification Search
USPC ................ 210/603, 605, 615, 259, 903, 908
See application file for complete search history.

(56) References Cited

U.S. PATENT DOCUMENTS

| 2009/0032451 A1* | 2/2009 | Tsutsumi | ............. | C02F 3/2806 |
| | | | | 210/150 |
| 2011/0068057 A1* | 3/2011 | Haley, III | ............... | C02F 3/006 |
| | | | | 210/615 |

FOREIGN PATENT DOCUMENTS

| CN | 204454743 U | 7/2015 |
| CN | 206955753 U | 2/2018 |
| CN | 109179872 A | 1/2019 |
| CN | 109264869 A | 1/2019 |
| CN | 110526391 A | 12/2019 |
| CN | 110606565 A | 12/2019 |
| CN | 209906581 U | 1/2020 |
| CN | 111056708 A | 4/2020 |
| CN | 112707503 A | 4/2021 |
| ES | 2401445 A1 | 4/2013 |

* cited by examiner

```
┌─────────────────────────────────────────────────────────────────┐
│ Collecting activated sludge and acclimating and culturing with  │
│ sewage to be treated to obtain a mixed solution, adding the     │
│ mixed solution into the integrated denitrifying and             │──S1
│ decarbonizing device when the mixed solution having suspended   │
│ solids in a concentration of 3,000 and 4,000 milligrams per     │
│ liter (mg/L), starting the device to make the activated sludge  │
│ adhere to surfaces of the carrier media 4 (i.e. basalt fibers), │
│ obtaining a bio-nest formed by micron-sized basalt fibers       │
└─────────────────────────────────────────────────────────────────┘
                                 │
                                 ▼
┌─────────────────────────────────────────────────────────────────┐
│ Injecting sewage to be treated from the water inlet 7 into the  │
│ chamber I along the baffle 3, where the sewage flows into the   │
│ chamber II after the chamber I is fully immersed with the       │
│ sewage from an opening at an upper end of the chamber I (each   │
│ chamber is divided into an upstream chamber and a downstream    │──S2
│ chamber, with sewage flows from the upper end of the upstream   │
│ chamber of each chamber into the downstream chamber of a next   │
│ chamber, and then enters the upstream chamber from a bottom of  │
│ the downstream chamber through the baffle 3), and the sewage    │
│ flows into the chamber III after the chamber II is fully        │
│ immersed by the sewage, and a graded treatment of sewage is     │
│ therefore arranged in the chamber I, chamber II, and the        │
│ chamber III                                                     │
└─────────────────────────────────────────────────────────────────┘
                                 │
                                 ▼
┌─────────────────────────────────────────────────────────────────┐
│ Pumping the sewage through the reflux water inlet 9 after       │
│ finishing the graded treatment into the chamber IV from the     │
│ reflux water outlet 8, then initiating the aeration device 6 to │──S3
│ drive the sewage to circulate in the chamber IV, where a        │
│ connecting pipe 17 is connected with the aerator 16 on one end  │
│ and communicated with an outside of the device body on the      │
│ other end so as to drive the sewage to be treated to circulate  │
│ internally in the chamber IV                                    │
└─────────────────────────────────────────────────────────────────┘
                                 │
                                 ▼
┌─────────────────────────────────────────────────────────────────┐
│ Pumping a certain amount of sewage into the chamber IV with the │
│ sewage flowing into the chamber I again through the             │
│ biomass-separating device 5 (i.e. through the clapboard 11 and  │──S4
│ basalt fiber felt 12) and mixing with influent wastewater to be │
│ treated from the water inlet 7, followed by sequentially        │
│ entering the chamber I, chamber II and chamber III for graded   │
│ treatment, then accomplishing the process of denitrification    │
│ and decarbonization; discharging the sewage treated by          │
│ denitrification and decarbonization out of the device body 1    │
│ through the water outlet 18, and discharging the biogas         │
│ generated during the process out of the device through the      │
│ exhaust ports 19.                                               │
└─────────────────────────────────────────────────────────────────┘
```

FIG. 4 ically degradable food and beverage wastewater. Efficient anaerobic treatment requires separation of HRT from SRT, so the biomass can be retained for a long duration; there are mainly three types of high-rate anaerobic reactors judging from the retention mode of biomass in the reactor, including anaerobic biofilm-fixed,
BAFFLED INTEGRATED DENITRIFYING AND DECARBONIZING DEVICE WITH ANAEROBIC BIO-NESTS AND BAFFLED INTEGRATED DENITRIFYING AND DECARBONIZING PROCESS WITH ANAEROBIC BIO-NESTS

CROSS-REFERENCE TO RELATED APPLICATIONS

This application is a continuation of PCT/CN2021/130841, filed Nov. 16, 2021, which claims priority to Chinese Patent Application No. 202011312077.4, filed on Nov. 20, 2020, the contents of which are hereby incorporated by reference.

TECHNICAL FIELD

The present application relates to the technical field of sewage treatment, and to a baffled integrated denitrifying and decarbonizing device with anaerobic bio-nests and a baffled integrated denitrifying and decarbonizing process with anaerobic bio-nests.

BACKGROUND

Most municipal wastewater is currently treated with the activated sludge processes where biomass exists in the suspended form. Among them, oxidation ditch, Anaerobic-Anoxic-Oxic (AO) technology, to name a few, are the typical processes; yet, these processes have defects for consuming too much energy in aeration, requiring highly on cost and maintenance, in addition to mismatch between hydraulic retention time (HRT) and solid retention time (SRT), as well as large output of excess sludge. There are also biofilm processes, whereby microorganisms are utilized to form a biofilm on the surface of carrier medium, so as to realize the separation of HRT and SRT accordingly. On the basis of spatial stratification of biofilm caused by mass transfer and other factors, biofilm integrates functions of Anoxic/Oxic (A/O) or anaerobic/anoxic/oxic (A2O) in activated sludge processes into a single reaction unit, and simplifying the process with no requiring of sludge reflux. Typical processes using biofilm include the biological rotating contactor, biological contact oxidation and biological aerated filters, which overcome many defects of activated sludge processes to some extent, and create conditions of slow-growing autotrophic bacteria (such as nitrifying bacteria) for aggregation as well, making the biological phases more diverse; however, the efficiency of biofilm process is restricted, since the biofilm generally has an effective thickness of less than 2 milliliters (mm) and often detaches under that influence of mass transfer, physical and chemical properties of carriers, hydraulic impact, local acidification and biogas production at the interface between microorganisms and carriers.

Compared to aerobic process, anaerobic process is advantageous in low energy consumption, low excess sludge production, and low operation and maintenance costs, in addition to energy recovery. As one of the typical anaerobic processes, continuous stirred tank reactors (CSTRs) are widely used in high-rate treatment of industrial wastewater, but are still limited to biochemically degradable food and beverage wastewater. Efficient anaerobic treatment requires separation of HRT from SRT, so the biomass can be retained for a long duration; there are mainly three types of high-rate anaerobic reactors judging from the retention mode of biomass in the reactor, including anaerobic biofilm-fixed, growth-suspended and mixed. Among them, suspended-growth upflow anaerobic sludge blanket (UASB) reactor accounts for a large proportion. Ideal anaerobic processes involve not only effective retention of biomass, but also efficient improvement of bacterial activity and adequate mixing thereof, as well as making bacteria in full contact with the substrate. Anaerobic baffled reactor (ABR) is a representative anaerobic process characterized, in terms of structure, by simple design, no moveable parts, no requirement for mechanical agitation, no clogging and effective reduction of sludge bulking, etc., the ABR therefore costs less in terms of investment, construction and operation; as for biomass, the ABR has no special requirement for the sedimentation of biomass, no requirement of fixed carrier media for biomass retention, and no requirement for special gas or sludge separation, yet the sludge production is less and the SRT is long; in operation, the ABR also provides short HRT with strong adaptability to the impact load of influent wastewater. ABR is also characterized by achieving the longitudinal separation of acid-producing and methane-producing processes, thus ensuring that different groups of bacteria can develop and function under their own suitable conditions. ABR uniquely avoids the limitations of other systems, such as clogging and sludge bulking faced by anaerobic filter and UASB. However, ABR is usually designed with a shallow reacting pool out of the reason of ensuring upflow velocity of liquid and gas, and ABR also fails to achieve a uniform water distribution. As reported, activated sludge process is combined with biofilm reactor to improve the system in terms of stability; moreover, fixed carrier media in engineering research are introduced into compartments of ABR so as to improve the efficiency of anaerobic treatment.

ABR is applicable for treatment of high-strength wastewater as well as low-strength municipal sewage, and together with biofilm reactor, ABR achieves practical engineering application in solving pressing problems confronted by most biological treatment processes, including: firstly, the effective thickness of biofilm formed on the carrier media is only a few millimeters and the biofilm is easy to detach, which directly affects the sewage treatment performance of existing processes negatively; secondly, the low productivity of anaerobic respiration leads to low cell yield and limited biomass attached to the carrier media; and thirdly, there are few simplified processes to achieve deep denitrification without an additional carbon source.

SUMMARY

The present application provides a baffled integrated denitrifying and decarbonizing device with anaerobic bio-nests, characterized by simplified structure and less requirement on construction and operation; the present application also provides a baffled integrated denitrifying and decarbonizing process with anaerobic bio-nests, achieving retention of large amount of anaerobic sludge and deep denitrification without additional carbon source, as well as enabling efficient treatment of sewage with less cost and energy consumption.

To realize the above objectives, the present application adopts technical schemes as follows:

a baffled integrated denitrifying and decarbonizing device with anaerobic bio-nests, including: a device body, a plurality of trough plates, and a plurality of baffles; the trough plates are connected with the device body inside and divide an inner cavity of the device body into chamber I, chamber II, chamber III, and chamber IV, where the chamber I, chamber II, and chamber III are sequentially arranged and communicated with each other, and the chamber IV is arranged at one side of the chamber I; the baffles are respectively arranged inside the chamber I, chamber II, chamber III, and chamber IV with each baffle having one end connected to the device body, and the baffles are arranged to guide sewage into each chamber; the chamber I, chamber II, and chamber III are respectively provided with several carrier media for purifying water and adhering microorganisms; the chamber IV is a nitrification tank arranged internally with a biomass-separating device and an aeration device, where the biomass-separating device has two ends connected with the trough plate and the baffle of chamber IV respectively, and water in the chamber IV can flow into the chamber I by penetrating through the biomass-separating device; the chamber I is provided with a water inlet, and the chamber III is provided with a reflux water outlet; the chamber IV is arranged with a reflux water inlet for leading the water from the reflux water outlet into the chamber IV; and the chamber III is arranged with a water outlet for discharging sewage out of the device after denitrification and decarbonization. Basically, the device is divided into four chambers, with chamber I mainly for converting carbohydrates, proteins and lipids in sewage to be treated into soluble organic molecules, chamber II mainly for acidifying sugars, amino acids and fatty acids and reducing nitrate, chamber III arranged for acetic acid production and nitrate reduction of volatile fatty acids (methane may be produced in the chamber II and chamber III), and chamber IV mainly treating effluent of chamber III with low carbon-nitrogen ratio by pumping the water from chamber III into chamber IV. The nitrification tank chamber IV is arranged independent, where untreated ammonia nitrogen in the chamber I, chamber II, and chamber III is further converted into nitrate nitrogen through nitrification, and nitrified liquid in the chamber IV enters the chamber I to mix with the sewage to be treated, so as to realize a deep denitrification of the sewage.

Optionally, the device body has a cuboid structure, with the trough plates arranged in parallel and connected with the device body inside, and chamber I, chamber II, and chamber III arranged in equal volume; the device body is also provided with a plurality of exhaust ports which are used for discharging biogas generated in the whole sewage treatment process.

Optionally, each baffle plate is provided with a bending structure, and the bending structure forms an angle of 120-150 degrees with the baffle plate; optionally, the bending structure of chamber I faces the chamber II, the bending structure of chamber II faces the chamber III, and all the bending structures are oriented in the same direction.

Optionally, the chamber I, chamber II, chamber III, and chamber IV are each provided with three carrier media, where each carrier medium is in an umbrella shape and consists of basalt fibers, and each chamber has three basalt fiber carrier media arranged at equal intervals.

Optionally, the basalt fibers have a monofilament diameter of 10-15 micrometers (μm). Basalt fibers of micro grade is an environmentally friendly material that can be introduced into activated sludge of aerobic process to form bio-aggregates of 10 centimeters (cm) or more in size, called "bio-nest"; such a bio-nest is stable in structure, with activity detectable at a depth of 6 cm, and dissolved oxygen present at the depth of 5 cm; in addition, the bio-nests have rich microbial diversity and allow for a deep removal of pollutants.

Optionally, the three carrier media of umbrella-shape in each chamber are connected in series by titanium wires with a diameter of 1-3 milliliters (mm), and the titanium wire is connected to the device body on both ends; the carrier media are immersed by the sewage to be treated; specifically, basalt fiber bundles with a length of 12-15 cm are prepared according to requirement, and titanium wires with a diameter of 1-3 mm are used as core materials to prevent them from rusting in water; two strands of stretched core materials are fixed on a knitting machine, and basalt fiber bundles are laid along the length direction of the core materials according to the usage amount of 1 gram per centimeter (g/cm) while ensuring that the two strands of titanium wire were twisted along the midpoint of basalt fiber bundles (the usage amount of basalt fiber in each carrier medium is 3 g); the knitting machine is started to twist titanium wires to form a bundle of finished products with three carrier media.

Optionally, the biomass-separating device includes a clapboard and a fiber felt, where the clapboard is arranged with a plurality of water permeable holes, and the fiber felt is laid on the clapboard; two ends of the clapboard are respectively connected to the trough plate and the baffle plate in the chamber IV; specifically, the biomass-separating device in chamber IV is arranged for preventing slow-growing nitrifying bacteria from being lost, the clapboard acts as a support for placing fiber felt and ensuring a normal flow of sewage, and the fiber felt is used for retaining nitrifying bacteria and improving the biomass in the chamber IV.

Optionally, the trough plate and the baffle plate in the chamber IV are both provided with slots; the clapboard are provided with buckles at both ends, and the buckles are inserted into the slots; the fiber felt is basalt fiber felt with thickness of 5-7 mm; the buckle and the slot are matched so as to fix the clapboard.

Optionally, the aeration device includes an aerator and a connecting pipe, where the aerator is arranged in the chamber IV, and connecting pipe is connected with the aerator on one end and communicated with an outside of the device body on the other end; the aeration device drives the sewage in the chamber IV to circulate internally during air intake.

A baffled integrated denitrifying and decarbonizing process with anaerobic bio-nests, including:

S1, collecting activated sludge and acclimating and culturing with sewage to be treated to obtain a mixed solution, adding the mixed solution into the integrated denitrifying and decarbonizing device when the mixed solution having suspended solids in a concentration of 3,000 and 4,000 milligrams per liter (mg/L), starting the device to make the activated sludge adhere to surfaces of the carrier media (i.e. basalt fibers), and obtaining a bio-nest precursor with a relatively stable initial structure;

S2, injecting sewage to be treated from a first water inlet into the chamber I along the baffle, where the sewage flows into the chamber II after the chamber I is fully immersed with the sewage (at this time, the basalt fiber carrier media are immersed by the sewage to be treated in the chamber I), and the sewage flows into the chamber III after the chamber II is fully immersed by the sewage, and a graded treatment of sewage is therefore arranged in the chamber I, chamber II, and the chamber III;

S3, pumping the sewage through the reflux water inlet after finishing the graded treatment into the chamber IV from the reflux water outlet, then initiating the aeration device to drive the sewage to circulate in the chamber IV; and S4, pumping a certain amount of sewage into the chamber IV with the sewage flowing into the chamber I again through the biomass-separating device (i.e., the sewage passes through the fiber felt through a plurality of water permeable holes on the clapboard) and mixing with influent wastewater to be treated from the first water inlet, followed by sequentially entering the chamber I, chamber II and chamber III for graded treatment, then accomplishing the process of denitrification and decarbonization; discharging the sewage treated by denitrification and decarbonization out of the device body through the water outlet, and discharging the biogas generated during the process out of the device through the exhaust ports.

The present application has the advantages that:

firstly, the denitrifying and decarbonizing device of the present application is simple in structure and costs less in construction and operation; the baffled integrated denitrifying and decarbonizing device with anaerobic bio-nests provided herein innovatively improves the conventional ABR by arranging micron-sized basalt fiber carrier media (i.e., the chamber I, II, and III) inside the conventional ABR, largely retaining anaerobic biomass to form bio-nests with a size of more than 10 cm, and the biofilm formed on the conventional carrier media is only a few microns thick in contrast; on the premise of not changing the basic configuration of ABR, an independent nitrification tank (i.e., the chamber IV) is embedded to realize the further conversion of ammonia nitrogen in the reflux liquid, as well as realizing deep denitrification after mixing with influent; with the clapboard and fiber felt installed in the nitrification tank, slow-growing nitrifying bacteria are retained while ensuring smooth water flow, and the independent nitrification tank is more energy-saving as comparing to the conventional aerobic process; secondly, the integrated process provided by the present application retains a large amount of anaerobic sludge and achieves deep removal of nitrogen without additional carbon source, which are achieved as follows: the basalt fiber carrier media of umbrella shape are introduced into a specific chamber of the ABR to develop an anaerobic bio-nest, and influent is gradually treated along the longitudinal direction of the reactor to realize simultaneous denitrification and organic substrate removal, with water outlet of low carbon-nitrogen ratio being pumped into the independent nitrification tank (chamber IV) for deep nitrification, followed by nitrified liquid and influent flowing into the anaerobic section again for deep denitrification. The integrated process of the present application overcomes the limitation of shallow pool of ABR to achieve efficient treatment of wastewater with advantages of both ABR and bio-nest, and greatly reduces energy consumption and investment requirements.

BRIEF DESCRIPTION OF THE DRAWINGS

In order to explain the technical scheme of the embodiments of the present application more clearly, the following will briefly introduce the drawings to be used in the description of the embodiments. Obviously, the drawings in the following description are only some embodiments of the present application. For those skilled in the art, other drawings may be obtained according to these drawings without any creative effort.

FIG. 4 illustrates a processing of the baffled integrated denitrifying and decarbonizing process with anaerobic bio-nests of the present application.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. The following description of at least one exemplary embodiment is in fact merely illustrative and in no way serves as any limitation on the present application and its application or utilization. Based on the embodiments of the present application, all other embodiments obtained without creative labor by a person of ordinary skill in the art fall within the scope of protection of the present application.

Embodiment 1

Figure 1:
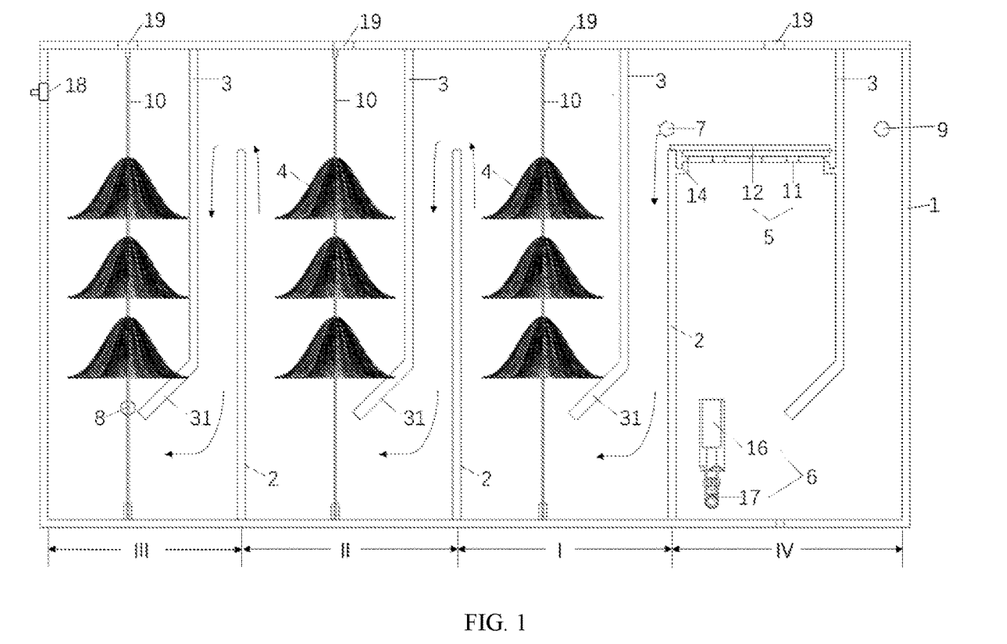
FIG. 1 shows a sectional view of a baffled integrated denitrifying and decarbonizing device with anaerobic bio-nests according to the present application.
Figure 2:
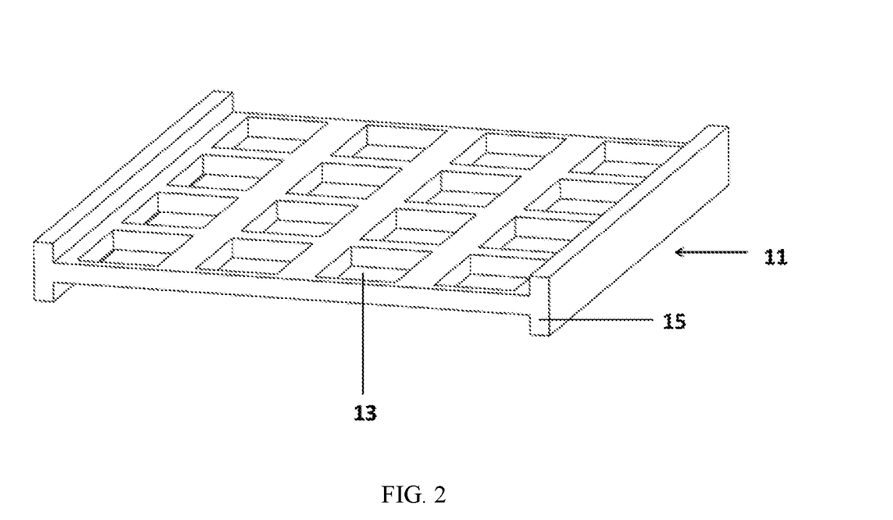
FIG. 2 shows a schematic structural diagram of baffles in the baffled integrated denitrifying and decarbonizing device with anaerobic bio-nests of the present application.
Figure 3:
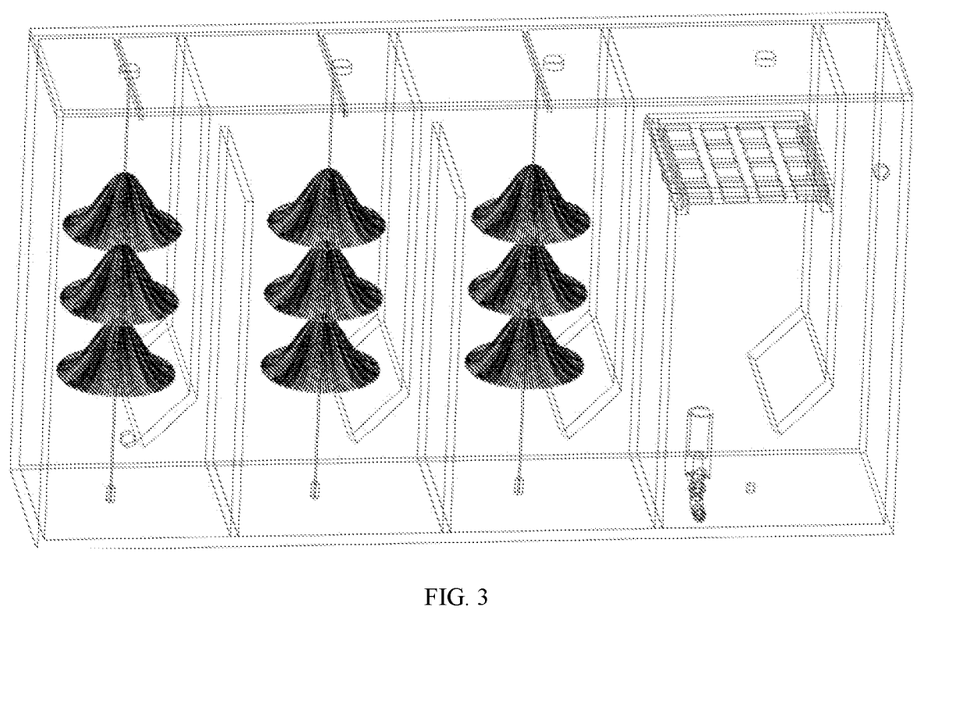
FIG. 3 shows a perspective view of the baffled integrated denitrifying and decarbonizing device with anaerobic bio-nests of the present application.

As shown in FIGS. 1-3, a baffled integrated denitrifying and decarbonizing device with anaerobic bio-nests includes a device body 1, three trough plates 2 and four baffle plates 3; the three trough plates 2 are connected to an inside of the device main body 1 and divide an internal space of the device body 1 into chamber I, chamber II, chamber III and chamber IV, where the chamber I, chamber II, and chamber III are sequentially arranged and communicated with each other, and the chamber IV is located at one side of the chamber I; the four baffles 3 are respectively arranged inside the chamber I, chamber II, chamber III, and chamber IV with each baffle having one end connected to the device body 1, and the baffles 3 are arranged to guide sewage into each chamber; the chamber I, chamber II, and chamber III are respectively provided with three carrier media 4 (the carrier media 4 are umbrella-shaped basalt fiber piles with monofilament diameter of the basalt fiber being 10-15 micrometers ($\mu m$)) used for purifying water and adhering microorganisms; the chamber IV is a nitrification tank arranged with a biomass-separating device 5 and an aeration device 6, where the biomass-separating device 5 has two ends connected with the trough plate 2 and the baffle 3 of chamber IV respectively, and water in the chamber IV can flow into the chamber I by penetrating through the biomass-separating device 5; the chamber I is provided with a water inlet 7, and the chamber III is provided with a reflux water outlet 8; the chamber IV is arranged with a reflux water inlet 9 for leading the water from the reflux water outlet 8 into the chamber IV; and the chamber III is arranged with a water outlet 18 for discharging sewage out of the device after denitrification and decarbonization.

The device body 1 in the Embodiment 1 has a cuboid structure, with three trough plates 2 arranged in parallel and connected with the device body 1 inside, and chamber I, chamber II, and chamber III being arranged in equal volume (chamber IV is arranged with a volume larger than other three chambers); the device body 1 is also provided with a plurality of exhaust ports 19 (used for discharging biogas generated in the whole treatment process). Each baffle plate 3 is provided with a bending structure 31, and the bending structure 31 forms an angle of 120-150 degrees with the baffle plate 3; the biomass-separating device 5 includes a clapboard 11 and a basalt fiber felt 12 (with a thickness of 5-7 millimeters (mm)), where the clapboard 11 is arranged with a plurality of water permeable holes 13 (as shown in FIG. 2), and the basalt fiber felt 12 is laid on the clapboard 11 (the basalt fiber felt 12 covers the water permeable holes 13 on the clapboard 11); two ends of the clapboard 11 are respectively connected to the trough plate 2 and the baffle plate 3 in the chamber IV; the trough plate 2 and the baffle plate 3 in the chamber IV are both provided with slots 14; the clapboard 11 are provided with buckles 15 at both ends, and the buckles 15 are inserted into the slots 14 so as to fix the clapboard 11 onto the trough plate 2 and the baffle board 3 located in the chamber IV.

Embodiment 2

A baffled integrated denitrifying and decarbonizing process with anaerobic bio-nests as shown in FIG. 4, including:

S1, collecting activated sludge and acclimating and culturing with sewage to be treated to obtain a mixed solution, adding the mixed solution into the integrated denitrifying and decarbonizing device when the mixed solution having suspended solids in a concentration of 3,000 and 4,000 milligrams per liter (mg/L), starting the device to make the activated sludge adhere to surfaces of the carrier media 4 (i.e. basalt fibers), obtaining a bio-nest formed by micron-sized basalt fibers;

S2, injecting sewage to be treated from the water inlet 7 into the chamber I along the baffle 3, where the sewage flows into the chamber II after the chamber I is fully immersed with the sewage from an opening at an upper end of the chamber I (each chamber is divided into an upstream chamber and a downstream chamber, with sewage flows from the upper end of the upstream chamber of each chamber into the downstream chamber of a next chamber, and then enters the upstream chamber from a bottom of the downstream chamber through the baffle 3), and the sewage flows into the chamber III after the chamber II is fully immersed by the sewage, and a graded treatment of sewage is therefore arranged in the chamber I, chamber II, and the chamber III;

S3, pumping the sewage through the reflux water inlet 9 after finishing the graded treatment into the chamber IV from the reflux water outlet 8, then initiating the aeration device 6 to drive the sewage to circulate in the chamber IV, where a connecting pipe 17 is connected with the aerator 16 on one end and communicated with an outside of the device body on the other end so as to drive the sewage to be treated to circulate internally in the chamber IV; and S4, pumping a certain amount of sewage into the chamber IV with the sewage flowing into the chamber I again through the biomass-separating device 5 (i.e. through the clapboard 11 and basalt fiber felt 12) and mixing with influent wastewater to be treated from the water inlet 7, followed by sequentially entering the chamber I, chamber II and chamber III for graded treatment, then accomplishing the process of denitrification and decarbonization; discharging the sewage treated by denitrification and decarbonization out of the device body 1 through the water outlet 18, and discharging the biogas generated during the process out of the device through the exhaust ports 19.

The baffled integrated denitrifying and decarbonizing process with anaerobic bio-nests of the present application is evaluated through the following specific tests:

simulated municipal sewage: including glucose, potassium nitrate and ammonium chloride as carbon source and nitrogen source respectively, with main compositions and concentrations as follows: influent COD with concentration of about 350 milligrams per liter (mg/L), total ammonia nitrogen with concentration of about 25 mg/L, and total nitrogen (TN) with concentration of about 35 mg/L; the denitrifying and decarbonizing device is run respectively under different factors and conditions to test the water treatment performance of this integrated process, with device arranged with basalt fiber carrier media 4 as the experimental group, and device without basalt fiber carrier media 4 as the control group;

(1) under the condition of dissolved oxygen (DO) in a concentration of 0-1 mg/L and reflux ratio of 100 percent (%), the removal efficiencies of COD, ammonia nitrogen and total nitrogen under different hydraulic retention time (HRT) are investigated, with results showing that an optimal water treatment performance is achieved in both the experimental group and the control group when HRT is 18 hours (h), where the removal efficiencies of COD, ammonia nitrogen and total nitrogen in the experimental group are 88.5±1.3%, 73.1±4.7%, and 71.8±5.2% respectively, and that of the control group are 85.5±0.7%, 49.4±4.1% and 52.5±2.9% respectively; above data show that the removal efficiencies of ammonia nitrogen and total nitrogen in the experimental group are obviously better than that in the control group, indicating that an efficient treatment of sewage is achieved by the denitrifying and decarbonizing device and the integrated denitrifying and decarbonizing process of the present application;

(2) under the condition of DO in a concentration of 0-1 mg/L and HRT being 18 h, the removal efficiencies of COD, ammonia nitrogen and total nitrogen under different reflux ratio are investigated, and results show that when the reflux ratio is 200%, both the experimental group and the control group have the best water treatment effect, and the removal efficiencies of COD, ammonia nitrogen and total nitrogen in the experimental group are 91.4±0.3%, 79.4±3.4%, and 79.0±2.8% respectively, and that of control group are 83.0±0.4%, 57.2±2.2%, and 64.3±3.5% respectively; and, it can be seen from the above data that the experimental group still shows higher removal efficiencies of COD, ammonia nitrogen and total nitrogen as comparing to the control group, indicating that the denitrifying and decarbonizing device and the integrated denitrifying and decarbonizing process of the present application is efficient in treating sewage; and (3) under the condition of HRT being 18 h and reflux ratio being 200%, the removal efficiencies of COD, ammonia nitrogen and total nitrogen in different of DO are investigated, and results show that when DO is between 1.0 and 2.0 mg/L, both the experimental group and the control group achieve the best water treatment performance, with the removal efficiencies of COD, ammonia nitrogen and total nitrogen in the experimental group being 90.0±1.0%, 86.5±2.5% and 85.9±1.6% respectively, and that of the control group being 85.5±0.5%, 71.4±2.1% and 75.5±0.9% respectively; still, the removal efficiencies of COD, ammonia nitrogen and total nitrogen in the experimental group are higher than that of control group, indicating that the denitrifying and decarbonizing device and the integrated denitrifying and decarbonizing process of the present application is efficient in treating sewage.

Compared with the conventional aerobic process, the independent nitrification tank (i.e. the chamber IV) arranged in the device of the present application saves about 60% energy; and the reactor gradually achieves a relative balance between sludge loss and microbial growth in activated sludge at HRT=18 h, so there is almost no need for sludge discharge.

The foregoing provides preferred embodiments of the present application for the purpose of explaining the application only and are not intended to limit the application. Any obvious variations or changes derived from the technical solutions of the present application remain within the scope of protection of the present application.

What is claimed is:

1. A baffled integrated denitrifying and decarbonizing device with anaerobic bio-nests, comprising:
    a device body, a plurality of trough plates, and a plurality of baffles, wherein the trough plates are connected with the device body inside and divide an inner cavity of the device body into chamber I, chamber II, chamber III, and chamber IV, the chamber I, the chamber II, and the chamber III are sequentially arranged and communicated with each other, and the chamber IV is arranged at one side of the chamber I; the baffles are respectively arranged inside the chamber I, the chamber II, the chamber III, and the chamber IV with each baffle having one end connected to the device body, and the baffles are arranged to guide sewage into each chamber; the chamber I, the chamber II, and the chamber III are respectively provided with several carrier media used for purifying water and adhering microorganisms; the chamber IV is a nitrification tank arranged internally with a biomass-separating device and an aeration device, the biomass-separating device has two ends connected with the trough plate and the baffle of chamber IV respectively, and water in the chamber IV flows into the chamber I by penetrating through the biomass-separating device; the chamber I is provided with a water inlet, and the chamber III is provided with a reflux water outlet; the chamber IV is arranged with a reflux water inlet for leading the water from the reflux water outlet into the chamber IV; and the chamber III is arranged with a water outlet for discharging sewage out of the device after denitrification and decarbonization;
    the chamber I, chamber II, chamber III, and chamber IV are each provided with three carrier media, each carrier medium is in an umbrella shape and consists of basalt fibers, and the basalt fibers have a monofilament diameter of 10-15 micrometers (μm);
    the biomass-separating device comprises a clapboard and a fiber felt, the clapboard is arranged with a plurality of water permeable holes, and the fiber felt is laid on the clapboard; and two ends of the clapboard are respectively connected to the trough plate and the baffle in the chamber IV; and
    the trough plate and the baffle in the chamber IV are both provided with slots; the clapboard is provided with buckles at both ends, and the buckles are inserted into the slots; the fiber felt has a thickness of 5-7 millimeters (mm).

2. The baffled integrated denitrifying and decarbonizing device with anaerobic bio-nests according to claim 1, wherein the device body has a cuboid structure with the trough plates arranged in parallel and connected with the device body inside, and the chamber I, the chamber II, and the chamber III are arranged in an equal volume; the device body is also provided with a plurality of exhaust ports used for discharging biogas generated in the whole sewage treatment process.

3. The baffled integrated denitrifying and decarbonizing device with anaerobic bio-nests according to claim 1, wherein each baffle is provided with a bending structure, and the bending structure forms an angle of 120-150 degrees with the baffle.

4. The baffled integrated denitrifying and decarbonizing device with anaerobic bio-nests according to claim 1, wherein the three carrier media are connected in series by titanium wires with a diameter of 1-3 mm, and the titanium wire is connected to the device body on both ends; and the carrier media are immersed by the sewage to be treated.

5. The baffled integrated denitrifying and decarbonizing device with anaerobic bio-nests according to claim 1, wherein the aeration device includes an aerator and a connecting pipe, the aerator is arranged in the chamber IV, and the connecting pipe is connected with the aerator on one end and communicated with an outside of the device body on an other end.

6. A baffled integrated denitrifying and decarbonizing process with anaerobic bio-nests, wherein the integrated denitrifying and decarbonizing process utilizes an integrated denitrifying and decarbonizing device with baffled anaerobic bio-nests according to claim 1, and the integrated process comprises:
    S1, collecting activated sludge and acclimating and culturing with sewage to be treated to obtain a mixed solution, adding the mixed solution into the denitrifying and decarbonizing device when the mixed solution has suspended solids in a concentration of 3,000 and 4,000 milligrams per liter (mg/L), starting the device to make the activated sludge adhere to surfaces of the carrier media;
    S2, injecting the sewage to be treated from the water inlet into the chamber I along the baffle inside the chamber I, the sewage flows into the chamber II after the chamber I is fully immersed with the sewage, and the sewage flows into the chamber III after the chamber II is fully immersed by the sewage, and a graded treatment of sewage is therefore arranged in the chamber I, the chamber II, and the chamber III;
    S3, pumping the sewage through the reflux water inlet after finishing the graded treatment into the chamber IV from the reflux water outlet, and then initiating the aeration device to drive the sewage to circulate in the chamber IV; and
    S4, letting the sewage flow into the chamber I again through the biomass-separating device and mixing with influent wastewater to be treated from the first water inlet, followed by sequentially entering the chamber I, the chamber II and the chamber III for graded treatment, then accomplishing a process of denitrification and decarbonization; discharging the sewage treated by denitrification and decarbonization out of the device body through the water outlet, and finally discharging biogas generated during the process out of the device through exhaust ports.

* * * * *